(12) United States Patent
Habe

(10) Patent No.: US 10,901,174 B2
(45) Date of Patent: Jan. 26, 2021

(54) CAMERA FOR LIMITING SHIFTING OF FOCUS ADJUSTMENT OPTICAL SYSTEM

(71) Applicant: NIKON CORPORATION, Tokyo (JP)

(72) Inventor: Masaru Habe, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/313,977

(22) PCT Filed: Jun. 30, 2017

(86) PCT No.: PCT/JP2017/024250
§ 371 (c)(1),
(2) Date: Dec. 28, 2018

(87) PCT Pub. No.: WO2018/004001
PCT Pub. Date: Jan. 4, 2018

(65) Prior Publication Data
US 2019/0170968 A1    Jun. 6, 2019

(30) Foreign Application Priority Data
Jun. 30, 2016    (JP) ................................ 2016-130687

(51) Int. Cl.
*G02B 7/34* (2006.01)
*H04N 5/374* (2011.01)
(Continued)

(52) U.S. Cl.
CPC .................. *G02B 7/34* (2013.01); *G02B 7/28* (2013.01); *G03B 13/36* (2013.01); *H04N 5/232* (2013.01);
(Continued)

(58) Field of Classification Search
CPC . G02B 7/34; G02B 7/28; G02B 7/005; H04N 5/232; H04N 5/23212; H04N 5/374;
(Continued)

(56) References Cited

U.S. PATENT DOCUMENTS 7,486,330 B2 * 2/2009 Sawachi ............ H04N 5/23212
348/345
8,570,427 B2 * 10/2013 Ohnishi ........... H04N 5/232127
348/345
(Continued)

FOREIGN PATENT DOCUMENTS

EP    0981245 A2    2/2000
JP    2007-017787 A    1/2007
(Continued)

OTHER PUBLICATIONS

Jan. 29, 2020 Search Report issued in European Patent Application No. 17820355.0.
(Continued)

*Primary Examiner* — Seung C Sohn
(74) *Attorney, Agent, or Firm* — Oliff PLC

(57) ABSTRACT

A camera includes: an image capturing unit that outputs a signal by capturing a subject image via an optical system having a focus adjustment optical system; a detection unit that detects an in-focus position at which the subject image is in focus on the image capturing unit by the optical system based on the signal outputted from the image capturing unit; a control unit that controls a position of the focus adjustment optical system so as to focus continuously upon a specified subject based on the in-focus position detected by the detection unit; and an acquisition unit that acquires information related to at least one of a distance to the specified subject, a size of the specified subject, and the optical system; wherein the control unit controls the position of the focus adjustment optical system based on the information acquired by the acquisition unit.

11 Claims, 7 Drawing Sheets

(51) Int. Cl.
  *G03B 13/36* (2006.01)
  *G02B 7/28* (2006.01)
  *H04N 5/232* (2006.01)
(52) U.S. Cl.
  CPC ... *H04N 5/23212* (2013.01); *H04N 5/232122* (2018.08); *H04N 5/374* (2013.01)
(58) Field of Classification Search
  CPC .......... H04N 5/23296; H04N 5/23219; H04N 5/232122; H04N 5/232127; G03B 13/36; G03B 3/02
  USPC ...................................................... 250/201.8
  See application file for complete search history.

(56) References Cited

U.S. PATENT DOCUMENTS

| | | |
|---|---|---|
| 2010/0067891 A1 | 3/2010 | Uenishi |
| 2012/0288264 A1 | 11/2012 | Aoyama et al. |
| 2014/0028835 A1 | 1/2014 | Sugawara |
| 2014/0104485 A1 | 4/2014 | Kobayashi |
| 2014/0168467 A1 | 6/2014 | Uenishi |

FOREIGN PATENT DOCUMENTS

| | | |
|---|---|---|
| JP | 2012-237809 A | 12/2012 |
| JP | 2014-027436 A | 2/2014 |
| JP | 2014-056260 A | 3/2014 |
| JP | 5446303 B2 | 3/2014 |
| JP | 2014-095893 A | 5/2014 |
| JP | 2014-119622 A | 6/2014 |
| JP | 2014-211589 A | 11/2014 |

OTHER PUBLICATIONS

"Digital Camera D750 User's Manual". Dec. 31, 2014, URL: <http://download.nikonimglib.com/archive3/zfZiH00gS82A04CSS4P024qk3H46/D750FM_DL(En_05.pdf>.

Oct. 8, 2019 Office Action issued in Japanese Patent Application No. 2018-525317.

Aug. 15, 2017 International Search Report issued in International Patent Application No. PCT/JP2017/024250.

Aug. 17, 2020 Office Action issued in Japanese Patent Application No. 2018-525317.

Aug. 25, 2020 Office Action issued in Japanese Patent Application No. 2018-525317.

* cited by examiner

FIG.2

| PHOTOGRAPHIC SUBJECT MAGNIFICATION RATIO | M1 | M2 | M3 | M4 | M5 | UNCLEAR |
|---|---|---|---|---|---|---|
| THRESHOLD VALUE | SH1 | SH2 | SH3 | SH4 | SH5 | SH3 |

50

CAMERA FOR LIMITING SHIFTING OF FOCUS ADJUSTMENT OPTICAL SYSTEM

TECHNICAL FIELD

The present invention relates to a camera.

BACKGROUND ART

An image capture device that continually adjusts its focus to a photographic subject even if the focus detection region shifts away from the photographic subject is per se known (refer to PTL1). However, if the photographic conditions change during photography or image capture, then it may become difficult to maintain focus adjustment upon the photographic subject with good accuracy.

CITATION LIST

Patent Literature

PTL1: Japanese Laid-Open Patent Publication No. 2012-237809

SUMMARY OF INVENTION

A camera according to a first aspect comprises: an image capturing unit that outputs a signal by capturing a subject image via an optical system having a focus adjustment optical system; a detection unit that detects an in-focus position at which the subject image is in focus on the image capturing unit by the optical system based on the signal outputted from the image capturing unit; a control unit that controls a position of the focus adjustment optical system so as to focus continuously upon a specified subject based on the in-focus position detected by the detection unit; and an acquisition unit that acquires information related to at least one of a distance to the specified subject, a size of the specified subject, and the optical system; wherein the control unit controls the position of the focus adjustment optical system based on the information acquired by the acquisition unit.

A camera according to a second aspect comprises: an image capturing unit that outputs a signal by capturing a subject image via an optical system having a focus adjustment optical system; a detection unit that detects an in-focus position at which the subject image is in focus on the image capturing unit by the optical system based on the signal outputted from the image capturing unit; a control unit that controls a position of the focus adjustment optical system so as to focus continuously upon a specified subject based on the in-focus position detected by the detection unit; and an acquisition unit that acquires information related to movement of the specified subject from image data generated from the signal outputted from the image capturing unit; wherein the control unit controls the position of the focus adjustment optical system based on the information acquired by the acquisition unit.

A camera according to a third aspect comprises: an image capturing unit that outputs a signal by capturing a subject image via an optical system having a focus adjustment optical system; a detection unit that detects an in-focus position at which the subject image is in focus on the image capturing unit by the optical system based on the signal outputted from the image capturing unit; a control unit that controls a position of the focus adjustment optical system so as to focus continuously upon a specified subject based on the in-focus position detected by the detection unit; and an acquisition unit that acquires information related to a size of a region that is employed for detecting the in-focus position; wherein the control unit controls the position of the focus adjustment optical system based on the information acquired by the acquisition unit.

BRIEF DESCRIPTION OF DRAWINGS

FIG. 2 shows an example of a control table according to the first embodiment;

DESCRIPTION OF EMBODIMENTS

First Embodiment

Figure 1:
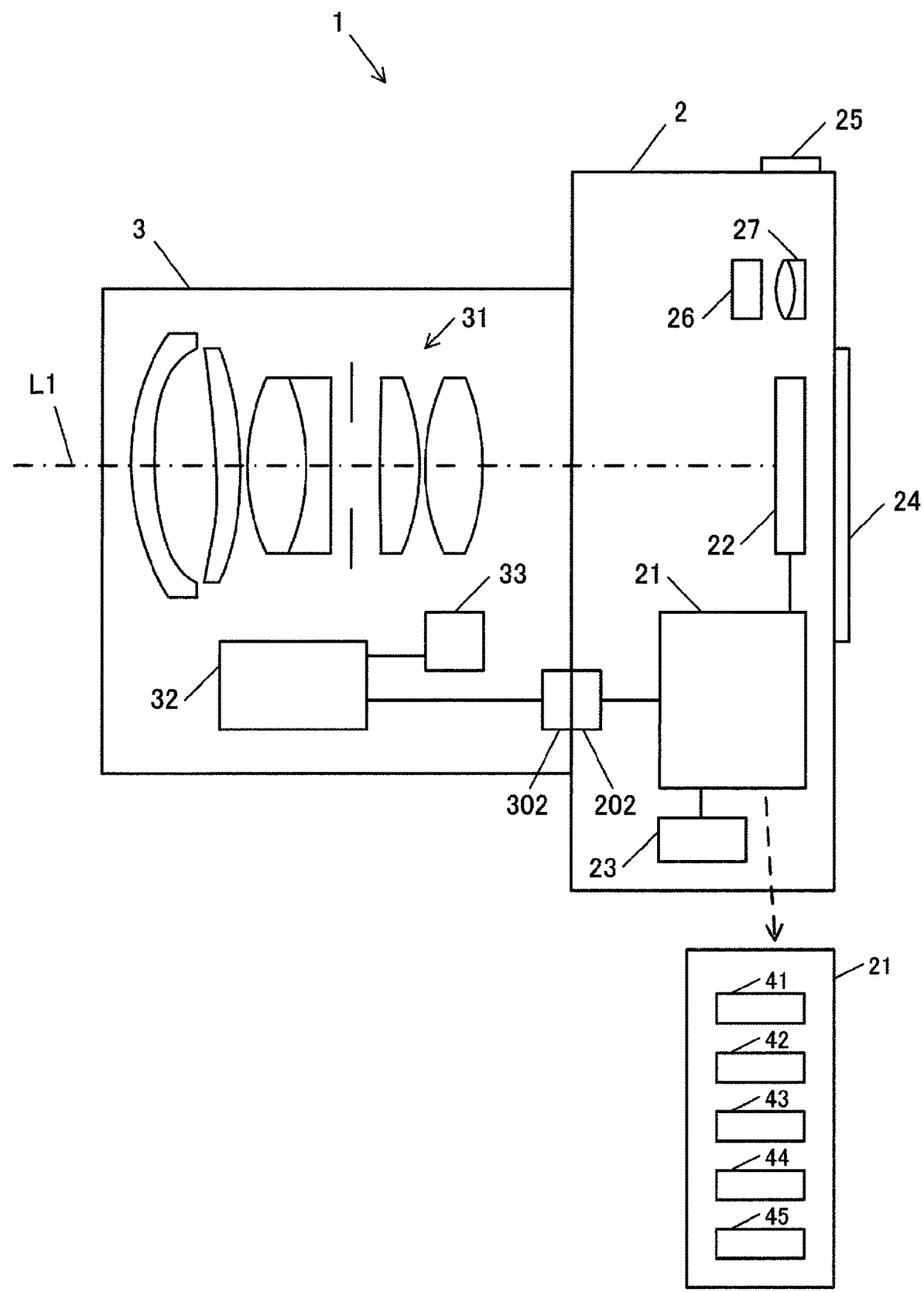
FIG. 1 is a structural diagram of principal portions of an image capture device according to a first embodiment.

FIG. 1 is a structural diagram showing principal portions of a digital camera 1 (hereinafter termed the "camera 1"), which is an image capture device according to the first embodiment. The camera 1 comprises a camera body 2 and an interchangeable lens 3. The interchangeable lens 3 is attached to the camera body 2 via a mounting unit (not shown in the figures). When the interchangeable lens 3 is attached to the camera body 2, a connection section 202 on the camera body 2 side and a connection section 302 on the interchangeable lens 3 side are connected together, and communication between the camera body 2 and the interchangeable lens 3 is enabled.

The interchangeable lens 3 comprises an image forming optical system (i.e. an image capture optical system) 31, a lens control unit 32, and a lens memory 33. The image forming optical system 31 comprises a plurality of lenses including a focus adjustment lens (i.e. a focusing lens) and a magnification altering lens (i.e. a zooming lens) and an aperture, and forms an image of a photographic subject (or a subject) upon an imaging surface of an imaging element 22 of the camera body 2. The lens control unit 32 causes the focus adjustment lens to shift forwards and backwards along an optical axis L1 on the basis of a signal outputted from a body control unit 21 of the camera body 2, and thereby adjusts an image forming position of the image forming optical system 31. A signal that specifies the shift amount of the focus adjustment lens, its shift direction and shifting speed and so on is included in the signal outputted from the body control unit 21. Moreover, the lens memory 33 includes a non-volatile storage medium or the like, and stores information corresponding to the interchangeable lens 3, that is, lens information including for example, information related to the position of the exit pupil of the image forming optical system 31 and so on. The lens information that is thus stored in the lens memory 33 is read out by the lens control unit 32, and is transmitted to the body control unit 21.

The camera body 2 comprises the body control unit 21, the imaging element 22, a memory 23, a display unit 24, an actuation unit 25, an electronic viewfinder (EVF) 26, and an eyepiece lens 27. The imaging element 22 is a CCD or CMOS image sensor or the like that comprises pixels for image capture arranged in a two dimensional format and pixels for focus detection according to a phase difference method that are arranged between the pixels for image capture, and captures an image of the photographic subject that is formed through the image forming optical system 31.

The imaging element 22 outputs an image signal produced by the pixels for image capture, and also outputs a focus detection signal produced by the pixels for phase difference method focus detection. The focus detection signals from the pixels for phase difference method focus detection include first and second focus detection signals respectively corresponding to first and second optical images produced by first and second light fluxes that have respectively passed through first and second regions of the exit pupil of the image forming optical system 31. The image signals and the focus detection signals generated by the imaging element 22 are sent to the body control unit 21. Although in the present embodiment, as described above, the imaging element 22 is of a type that comprises pixels for image capture and pixels for phase difference method focus detection, it would also be acceptable for it to be of a type that comprises pixels that serve both for image capture and also for phase difference method focus detection. In this case, the signals from these pixels that serve both for image capture and also for phase difference method focus detection would serve both as image signals and as focus detection signals.

The memory 23 is a recording medium such as a memory card or the like, and writing and reading out of image data, audio data and so on thereupon/therefrom are performed by the body control unit 21. The display unit 24 displays an image corresponding to image data generated by the body control unit 21. Moreover, the display unit 24 displays information of various types corresponding to photographic conditions (such as shutter speed, aperture value, ISO speed, and the like) and menu screens and so on. The actuation unit 25 includes a release button, a video recording button, setting switches of various types, and so on, and outputs a signal corresponding to actuation of this actuation unit 25 to the body control unit 21. The electronic viewfinder 26 performs display of an image corresponding to image data generated by the body control unit 21. Moreover, the electronic viewfinder 26 performs display of various types of information corresponding to photographic conditions. The images and information of various types displayed by the electronic viewfinder 26 are observed by the user via the eyepiece lens 27.

The body control unit 21 comprises a CPU, ROM, RAM and so on, and controls the various sections of the camera 1 on the basis of a control program. Moreover, the body control unit 21 performs signal processing of various types. For example, the body control unit 21 supplies a control signal to the imaging element 22 and thereby controls the operation of the imaging element 22. Moreover, the body control unit 21 performs image processing of various types upon the image signal outputted from the imaging element 22, and thereby generates image data. The body control unit 21 comprises a focus detection unit 41, a focus adjustment unit 42, a photographic subject detection unit 43, a magnification information acquisition unit 44, and a focus adjustment control unit 45.

The focus detection unit 41 repeatedly detects the focal adjustment state of the image forming optical system 31. In concrete terms, the focus detection unit 41 calculates a defocusing amount, which is indicative of the focal adjustment state, according to a split pupil type phase detection method that employs the first and second focus detection signals from the phase difference method focus detection pixels of the imaging element 22. The focus detection unit 41 takes a plurality of regions within the imaging surface of the imaging element 22 in which pixels for phase difference method focus detection are disposed as being focus detection regions (i.e. as being AF areas), and repeatedly calculates the defocusing amount of the photographic subject within those focus detection regions at high speed.

The focus adjustment unit 42 performs focus adjustment of the image forming optical system 31 by generating information related to the shift amount, the shift direction or the like of the focus adjustment lens from the defocusing amount, which is the result of detection by the focus detection unit 41, and transmitting this information to the lens control unit 32. And the lens control unit 32 drives a motor not shown in the figures on the basis of this information transmitted from the focus adjustment unit 42 of the body control unit 21, so that the focus adjustment lens is shifted to a position, in other words to an in-focus position, by which an image through the image forming optical system 31 can be formed upon the imaging surface of the imaging element 22. The camera 1 performs AF (auto-focus) processing by a phase detection method in this manner.

According to a photographic subject recognition technique or the like, the photographic subject detection unit 43 detects a specified photographic subject as being the main photographic subject. In the present embodiment, the main photographic subject is the face of a person or the like. And the magnification information acquisition unit 44 acquires related information related to the magnification ratio of the main photographic subject. For example, the magnification information acquisition unit 44 may calculate the magnification ratio of the photographic subject (i.e. the photographic magnification) from the proportion between the size of the region of the main photographic subject detected by the photographic subject detection unit 43 and the size of a standard human face, and may acquire this information specifying the photographic subject magnification ratio as being the related information. It should be understood that it would also be acceptable for the magnification information acquisition unit 44 to calculate the photographic subject magnification ratio on the basis of the focal length of the image forming optical system 31 and the photographic distance for the main photographic subject.

The focus adjustment control unit 45 makes a decision as to whether or not the amount of change of the defocusing amount calculated repeatedly by the focus detection unit 41, in other words the difference between the defocusing amount calculated in the previous cycle and the defocusing amount calculated in the current cycle, is greater than a predetermined threshold value. And, if the amount of change of the defocusing amount is greater than the predetermined threshold value, then the focus adjustment control unit 45 limits or prohibits the focus adjustment operation of the image forming optical system 31 on the basis of the defocusing amount calculated for a predetermined time period. In the following description, this function for limitation or prohibition ("AF locking on") of the focus adjustment operation of the image forming optical system 31 will be termed the "AF lock on function". While AF lock on is being performed, focus adjustment of the image forming optical system 31 by the focus adjustment unit 42 is limited or prohibited.

The AF lock on function may, for example, operate when a foreign object crosses in front of the subject that is to be photographed. In other words, if the difference between the defocusing amount that has been calculated in the previous cycle for the subject that is to be photographed and the defocusing amount that is calculated in the current cycle for a foreign object that crosses in front of it is greater than the predetermined threshold value, then the focus adjustment operation is limited or prohibited for the predetermined time period. Due to this, it is possible to prevent the operation of focus adjustment from being performed upon the foreign object, so that it is possible to keep the focus upon the subject that is actually to be photographed. The AF lock on function operates while a specified photographic subject is being tracked, so as to keep the focus continuously upon that specified photographic subject. Apart from the AF lock on function being started when a foreign object crosses in front of the subject to be photographed as described above, it is also started (executed) in the following circumstances. That is, when for example a moving photographic subject is being photographed or captured by shifting the camera 1 according to the movement of the subject so that the moving photographic subject is always kept within the focus detection region, then, even if the moving photographic subject temporarily strays out from the focus detection region or the like, the AF lock on function operates so as to limit or prohibit the focus adjustment operation for the predetermined time period. The predetermined threshold value described above is a reference value for making the decision as to whether or not AF lock on operation is to be executed.

As described above, the focus adjustment control unit 45 determines whether or not to perform AF lock on, on the basis of whether or not the amount of change of the defocusing amount exceeds the predetermined threshold value. This predetermined threshold value is determined so as to satisfy a first condition and a second condition described below. That is, the first condition is that the predetermined threshold value is determined to be greater than the amount of change of the defocusing amount generated due to the actual shift of the subject to be photographed along the direction of the optical axis of the image forming optical system 31 during successive focus detection operations. This is in order for focus adjustment to be performed upon the subject to be photographed that is shifting along the direction of the optical axis without the AF lock on function being started if the subject to be photographed actually shifts along the direction of the optical axis of the focus adjustment optical system 31 during successive focus detection operations.

The second condition is that the predetermined threshold value should change according to the photographic distance between the subject to be photographed and the camera 1, in other words according to the photographic subject magnification ratio (i.e., according to the reproduction ratio). In concrete terms, the predetermined threshold value is determined so that it becomes smaller along with the photographic distance becoming larger (i.e. as the photographic subject magnification ratio becomes smaller). For example, a relatively small threshold value SH(S) is set for a far away photographic subject A1 whose photographic distance is relatively large (i.e. for a photographic subject whose photographic subject magnification is small), whereas a relatively large threshold value SH(L) is set for a nearby photographic subject A2 whose photographic distance is relatively small (i.e. for a photographic subject whose photographic subject magnification ratio is large).

This second condition is established in consideration of the fact that the difference ($|\Delta 1a - \Delta 1b|$) between the defocusing amounts $\Delta 1a$ and $\Delta 1b$ related to two far away photographic subjects A1$a$ and A1$b$ that are separated along the direction of the optical axis by a distance D0 is smaller than the difference ($|\Delta 2a - \Delta 2b|$) between the defocusing amounts $\Delta 2a$ and $\Delta 2b$ related to two nearby photographic subjects A2$a$ and A2$b$ that are separated by the same distance D0 in the same direction. In other words, for example, the amount of change of the defocusing amount when a foreign object has crossed in front of a far away photographic subject A1 at a distance d0 therefrom is smaller than the amount of change of the defocusing amount when a foreign object has crossed in front of a nearby photographic subject A2 at the same distance d0 therefrom.

Accordingly the threshold value SH(S) for a far away photographic subject is set so that the amount of change of the defocusing amount when a foreign object crosses in front of the far away photographic subject A1 at a distance d0 from the far away photographic subject is greater than that threshold value SH(S). Moreover, the threshold value SH(L) for a nearby photographic subject is set so that the amount of change of the defocusing amount when a foreign object crosses in front of the nearby photographic subject at the same distance d0 from the nearby photographic subject is greater than that threshold value SH(L).

If the threshold value were to have a constant value irrespective of the magnification ratio of the photographic subject, then the amount of change of the defocusing amount when a foreign object crosses in front of a nearby photographic subject at a distance d0 therefrom would exceed the constant threshold value described above, and the AF lock on function would be started. However, the amount of change of the defocusing amount when a foreign object crosses in front of a far away photographic subject at the same distance d0 therefrom would not exceed the constant threshold value described above, so that there would be a possibility that the AF lock on function might not be started. In other words, if the AF lock on function is not executed, then focus adjustment operation will be performed on the basis of the defocusing amount calculated for the foreign object.

By contrast, in the present embodiment, the predetermined threshold value is determined so as to become smaller as the photographic distance becomes greater (i.e. as the photographic subject magnification ratio becomes smaller). Accordingly, when a foreign object crosses in front of a nearby photographic subject at the distance d0 therefrom, the amount of change of the defocusing amount exceeds the threshold value SH(L) for a nearby photographic subject, so that the AF lock on function is started. Moreover, even when a foreign object crosses in front of a far away photographic subject at the same distance d0 therefrom, the amount of change of the defocusing amount exceeds the threshold value SH(S) for a far away photographic subject, so that the AF lock on function is started.

Thus, in the present embodiment, in order to determine the predetermined threshold value to become smaller along with the photographic subject magnification ratio becoming smaller (i.e. along with the photographic distance becoming greater), the following correspondence is established between the photographic subject magnification ratio and the predetermined threshold value. That is, as shown in FIG.

2, the photographic subject magnification ratio is divided into five photographic subject magnification ratio ranges M1, M2, M3, M4, and M5, and predetermined threshold values SH1, SH2, SH3, SH4, and SH5 are set in correspondence to these photographic subject magnification ratio ranges M1, M2, M3, M4, and M5 respectively. In more detail, the first threshold value SH1 is set for the photographic subject magnification ratio range M1 (=1/20 or greater), and the second threshold value SH2, which is smaller than the first threshold value SH1, is set for the photographic subject magnification ratio range M2 (=1/40 or greater and less than 1/20). In a similar manner, the third threshold value SH3, which is smaller than the second threshold value SH2, is set for the photographic subject magnification ratio range M3 (=1/80 or greater and less than 1/40). Furthermore, the fourth threshold value SH4, which is smaller than the third threshold value SH3, is set for the photographic subject magnification ratio range M4 (=1/200 or greater and less than 1/80), and the fifth threshold value SH5, which is smaller than the fourth threshold value SH4, is set for the photographic subject magnification ratio range M5 (less than 1/200). Moreover if the photographic subject magnification ratio is unclear for some reason, in other words if the magnification information acquisition unit 44 has not been able to acquire the photographic subject magnification ratio, then the threshold value SH3 for the standard photographic subject magnification ratio range M3 is set.

Each of these threshold values SH1 through SH5 is determined so that the first and second conditions described above are satisfied. In other words, each of the threshold values SH1 through SH5 is determined so as to be greater than the amount of change of the defocusing amount engendered due to the fact that the subject to be photographed has actually shifted along the direction of the optical axis during successive focus detection operations. Furthermore, each of the threshold values SH1 through SH5 may, for example, be determined so that the amount of change in the defocusing amount becomes greater than or equal to the respective threshold value if a foreign object crosses at substantially the same distance in front of the photographic subject at the respective photographic subject magnification ratio.

It should be understood that the correspondence relationship shown in FIG. 2 between the photographic subject magnification ratio ranges M1, M2, M3, M4, and M5 and the predetermined threshold values SH1, SH2, SH3, SH4, and SH5 is stored in a control table 50 in a memory of the body control unit 21. According to information specifying the photographic subject magnification ratio acquired by the magnification information acquisition unit 44, the focus adjustment control unit 45 selects the corresponding threshold value from the control table 50, in other words sets that corresponding threshold value. Accordingly, when the magnification information acquisition unit 44 acquires a photographic subject magnification ratio belonging to one of the photographic subject magnification ratio ranges M1, M2, M3, M4, or M5, the focus adjustment control unit 45 selects the threshold value corresponding to that photographic subject magnification ratio range to which that photographic subject magnification ratio belongs. Due to this, if for example the photographic subject magnification ratio is within the photographic subject magnification ratio range M1, then, when the subject to be photographed shifts along the direction of the optical axis, the focus adjustment control unit 45 starts the AF lock on function if the amount of change of the defocusing amount exceeds the first threshold value SH1. In a similar manner, if the photographic subject magnification ratio is within the photographic subject magnification ratio range M2, M3, M4, or M5, then the focus adjustment control unit 45 starts the AF lock on function if the amount of change of the defocusing amount becomes greater than the second, third, fourth, or fifth threshold value SH2, SH3, SH4, or SH5 respectively.

Figure 3:
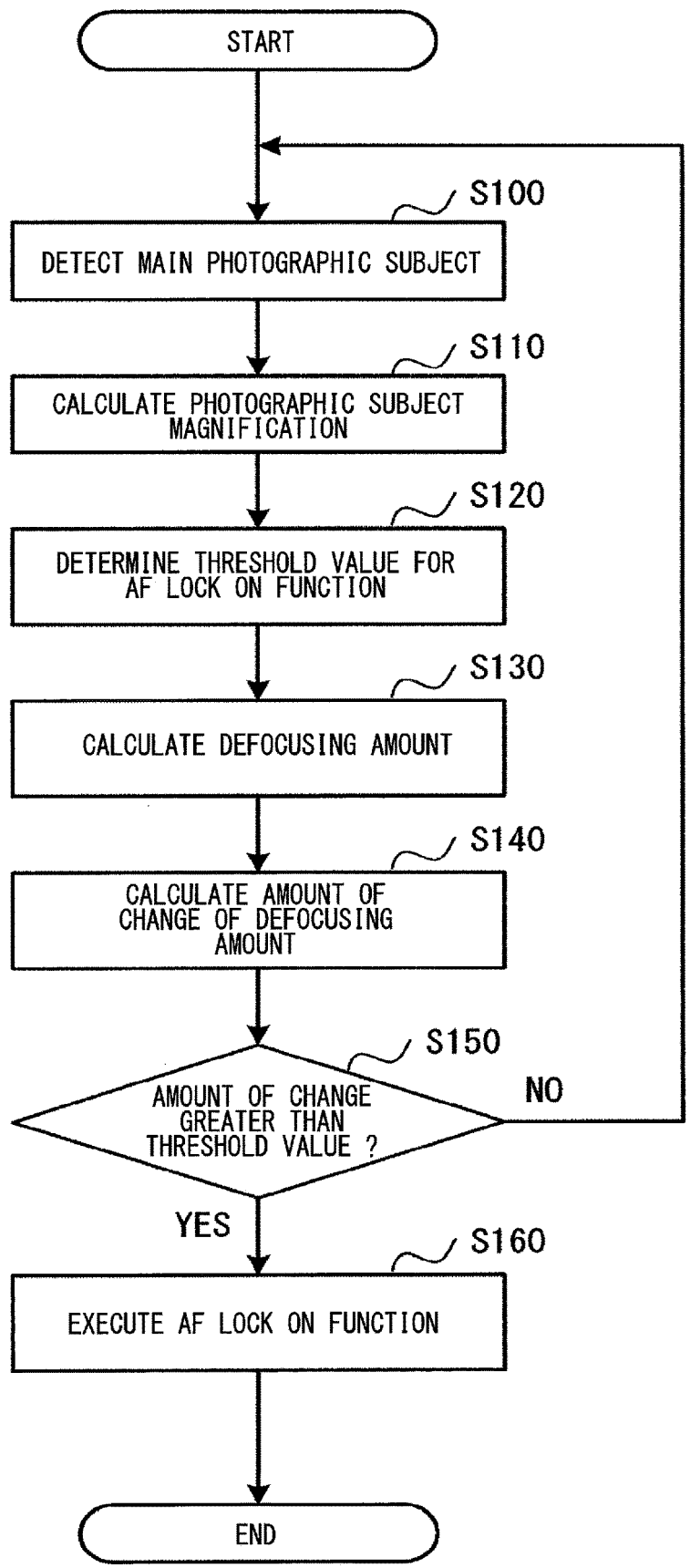
FIG. 3 is a flow chart showing an example of the operation of the image capture device according to the first embodiment.

FIG. 3 is a flow chart showing an example of the operation of this image capture device according to the first embodiment. The processing shown in FIG. 3 is, for example, executed repeatedly while photography is being performed.

In step S100, by employing a signal outputted from the imaging element 22, the body control unit 21 of the camera body 2 detects the face of a person as being the main photographic subject. And in step S110 the body control unit 21 calculates the photographic subject magnification ratio by employing the size of the facial region of the person. Then in step S120 the body control unit 21 sets the threshold value for the AF lock on function on the basis of the photographic subject magnification ratio that has thus been calculated and the control table 50 shown in FIG. 2. And in step S130 the body control unit 21 performs focus detection calculation by a phase detection method.

In step S140, the body control unit 21 calculates the difference between the defocusing amount that was calculated by the focus detection calculation in the previous cycle and the defocusing amount that has been calculated by the focus detection calculation in the current cycle, in other words the amount of change of the defocusing amount. And in step S150 the body control unit 21 makes a decision as to whether or not the amount of change of the defocusing amount is greater than the threshold value set in step S120. If the amount of change of the defocusing amount is greater than the threshold value set in step S120 then the flow of control proceeds to step S160, in which the AF lock on function is started so that focus adjustment operation is limited or prohibited for a predetermined time period.

But if, in step S150, the amount of change of the defocusing amount is not greater than the threshold value set in step S120, then the flow of control returns to step S100. In this manner, in the present embodiment, according to change of the photographic subject magnification ratio, it is possible automatically to change over the threshold value that determines whether or not the AF lock on function is executed. Moreover, by changing over the threshold value according to the magnification ratio of the photographic subject, it is possible to execute the AF lock on function when a foreign object crosses in front of the photographic subject at almost the same distance from the photographic subject whatever may be the magnification ratio of the photographic subject.

It should be understood that it would also be acceptable for the body control unit 21 to limit or to prohibit focus adjustment with the AF lock on function on the basis of at least one of the distance to the photographic subject, the focus distance, the size of the image of the photographic subject upon the imaging surface of the imaging element 22, the focal length of the image forming optical system 31, the angle of view, and the reproduction ratio. For example, from any of the items of information described above, the body control unit 21 may acquire the magnification ratio of the photographic subject (i.e. the reproduction ratio), the size of the photographic subject, the zoom magnification of the image forming optical system 31, whether the image forming optical system 31 is at the wide angle side or at the telephoto side, or the angle of view. And the body control unit 21 may make a decision as to whether or not to execute AF lock on from the information that has thus been acquired and the predetermined threshold value. The predetermined threshold value may also be set in advance so that it becomes greater, the shorter the distance to the photographic subject becomes, or the shorter the focus distance to the photographic subject becomes, or the greater the size of a specified photographic subject becomes, or the greater the magnification of the optical system described above becomes, or the more the optical system described above is adjusted toward the telephoto side, or the greater the reproduction ratio becomes, or the narrower the angle of view becomes. Moreover, it would also be acceptable for the predetermined threshold value to be set according to the photographic mode or the scene mode. For example, the predetermined threshold value when the photographic mode is the sports photographic mode may be set to be higher than the predetermined threshold value when the photographic mode is the scenery photographic mode.

According to the first embodiment described above, the following advantageous operational effects are obtained.

(1) The camera body 2 comprises the focus detection unit 41 that repeatedly detects the focus adjustment state of the optical system 31, the focus adjustment unit 42 that performs focus adjustment of the optical system 31 on the basis of the result of detection by the focus detection unit 41, the magnification information acquisition unit 44 that acquires related information related to the magnification ratio of the main photographic subject, and the control unit (the focus adjustment control unit 45) that limits or prohibits focus adjustment by the focus adjustment unit 42 when the amount of change of the result of detection by the focus detection unit 41 is greater than the threshold value. The size of the threshold value is determined on the basis of the related information acquired by the magnification information acquisition unit 44. In the present embodiment, the threshold value for making the decision as to whether or not to execute AF lock on is determined on the basis of the magnification ratio of the photographic subject. Due to this, even if the magnification ratio of the photographic subject changes, it is possible to adjust a threshold value for the AF lock on function that is appropriate for the photographic subject. It is therefore possible to prevent the threshold value for the AF lock on function that was appropriate at the start of photography from becoming an inappropriate value while photography is being performed. As a result, it is possible to track a subject to be photographed in a continuous manner.

(2) The focus adjustment control unit 45 increases the threshold value as the related information increases. In the present embodiment, the threshold value for the AF lock on function is increased as the photographic subject magnification ratio increases. Since this is done, accordingly it is possible to execute the AF lock on function when a foreign object crosses in front of the photographic subject at almost the same distance from the photographic subject at any photographic magnification ratio.

(3) The camera body 2 further comprises an image capturing unit (i.e. the imaging element 22) that captures an image of the photographic subject and generates image capture data, and the photographic subject detection unit 43 that detects the main photographic subject on the basis of the image capture data generated by the image capturing unit. The photographic subject detection unit 43 detects a face as being the main photographic subject. And the information related to the size of the main photographic subject is information related to the size of the face. Accordingly it is possible to set the threshold value for the AF lock on function according to the size of the face of the photographic subject. As a result, it is possible to perform photography with a threshold value for the AF lock function that is appropriate for the subject to be photographed.

Second Embodiment

An image capture device according to a second embodiment of the present invention will now be explained with reference to FIG. 4 through FIG. 7. It should be understood that, in these figures, the same reference numbers are appended to elements that are the same as elements of the first embodiment or that correspond thereto, and the explanation will primarily focus upon the aspects of difference from the first embodiment. In the first embodiment, an example was explained in which the threshold value for deciding whether or not to execute AF lock on was varied on the basis of the related information related to the magnification ratio of the main photographic subject. However, in this second embodiment, an example will be explained in which the time period for limiting or prohibiting focus adjustment operation by executing the AF lock on function is varied on the basis of related information related to the motion vector of the main photographic subject and on the basis of region information related to the size of the focus detection region.

Figure 4:
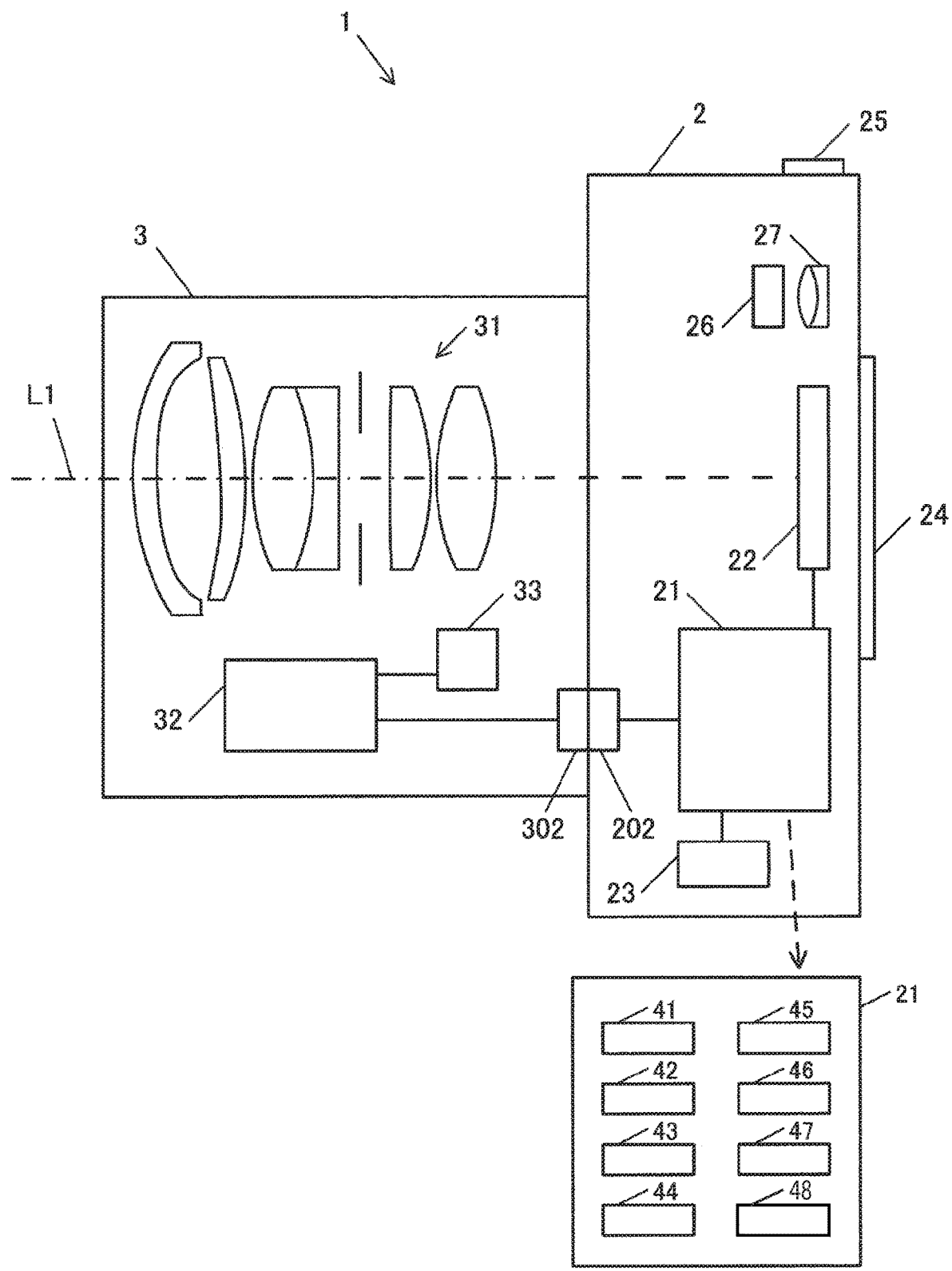
FIG. 4 is a structural diagram of principal portions of an image capture device according to a second embodiment.

FIG. 4 is a structural diagram of principal portions of the image capture device according to the second embodiment. In this second embodiment, the body control unit 21 comprises the focus detection unit 41, the focus adjustment unit 42, the photographic subject detection unit 43, the magnification information acquisition unit 44, the focus adjustment control unit 45, a region information acquisition unit 46, a motion vector information acquisition unit 47, and a focus detection region setting unit 48.

Figure 5:
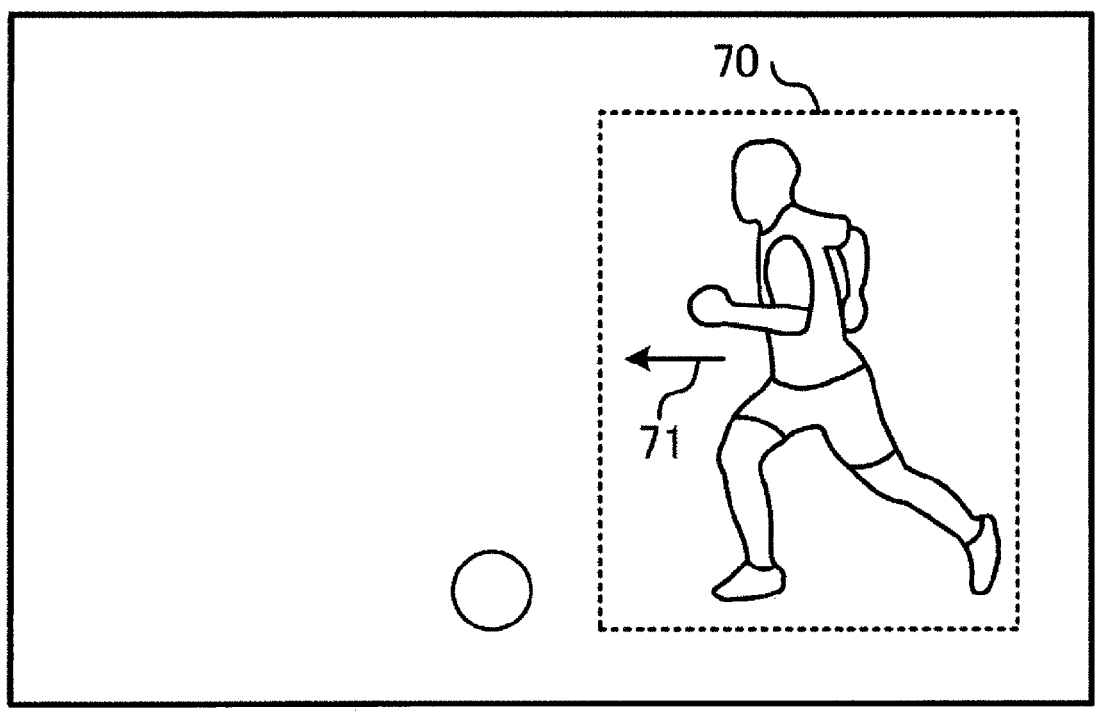
FIG. 5 is a figure showing an example of a focus detection region of the image capture device according to the second embodiment.

FIG. 5 is a figure showing an example of a focus detection region of this image capture device according to the second embodiment. In the example shown in FIG. 5, a focus detection region 70 is shown that is set on the screen of the camera 1 when a soccer game is photographed. On, for example, the basis of the region of the main photographic subject as detected by the photographic subject detection unit 43, the focus detection region setting unit 48 sets the focus detection region 70 so as to include the region of the main photographic subject. And the focus detection unit 41 performs calculation of the defocusing amount by employing first and second focus detection signals from pixels of the imaging element 22 for phase difference method focus detection corresponding to this focus detection region 70 that has thus been set. In other words, the focus detection region 70 becomes the region (i.e. the range) that is employed for detection of the focal adjustment state of the image forming optical system 31. The region information acquisition unit 46 acquires information specifying the size of the focus detection region 70 as region information. It should be understood that it would also be acceptable for the region information acquisition unit 46 to acquire the size of the pixel region on the imaging element 22 corresponding to the focus detection region 70 as region information.

The motion vector information acquisition unit 47 acquires related information related to the motion vector of the main photographic subject. For example, the motion vector information acquisition unit 47 may detect the motion vector of the photographic subject by employing image data for a plurality of frames. The arrow sign 71 shown in FIG. 5 schematically shows the motion vector of the photographic subject that has been detected. The motion vector information acquisition unit 47 calculates the amount of shifting of the photographic subject between frames on the basis of the motion vector of the photographic subject, and acquires information specifying the amount of shifting of the photographic subject as the related information. The amount of shifting of the photographic subject becomes large when the speed of the photographic subject is fast, or when the amount of shaking of the camera by the user during photography is large, or the like.

When the amount of change of the defocusing amount is greater than the predetermined threshold value, then the focus adjustment control unit 45 limits or prohibits focus adjustment operation of the image forming optical system 31 on the basis of the defocusing amount that has been calculated for a predetermined time period. Moreover, in the present embodiment, the focus adjustment control unit 45 changes the predetermined time period during which focus adjustment operation is limited or prohibited, according to the size of the focus detection region or according to the amount of shifting of the photographic subject.

When photography is being performed while shifting the camera 1 according to movement of the photographic subject so that the photographic subject remains within the focus detection region, if the photographic subject temporarily wanders out of the focus detection region, then the AF lock on function is operated and focus adjustment operation is limited or prohibited for a predetermined time period. In comparison between a case when the amount of movement of the photographic subject is large and a case when it is small: it is considered that, when the amount of movement is large, the time period over which the subject being photographed remains outside the focus detection region will be long, while, when the amount of movement is small, the time period over which the subject being photographed remains outside the focus detection region will be short. Moreover, in comparison between a case when the size of the focus detection region is large and a case when it is small: it is considered that, when the size is large, the time period over which the subject being photographed remains outside the focus detection region will be short, while, when the size is small, the time period over which the subject being photographed remains outside the focus detection region will be long.

Accordingly, if the predetermined time period for limitation or prohibition of focus adjustment operation is set to a fixed time period irrespective of the size of the focus detection region or of the amount of movement of the photographic subject, then the AF lock on function may be cancelled, before the subject to be photographed enters back into the focus detection region after having gone out from the focus detection region. In this case, the focus adjustment operation will undesirably come to be performed upon a subject that is different from the subject that is to be photographed. By contrast, with the present embodiment, the predetermined time period for limitation or prohibition of focus adjustment operation is determined on the basis of the amount of movement of the main photographic subject and on the size of the focus detection region. Accordingly, when the photographic subject moves out of the focus detection region, the focus adjustment operation is limited or prohibited during the time period that is predetermined in consideration of the amount of movement of the main photographic subject and of the size of the focus detection region, so that the focus adjustment can be again performed on the photographic subject that has been moved back within the focus detection region.

Figure 6:
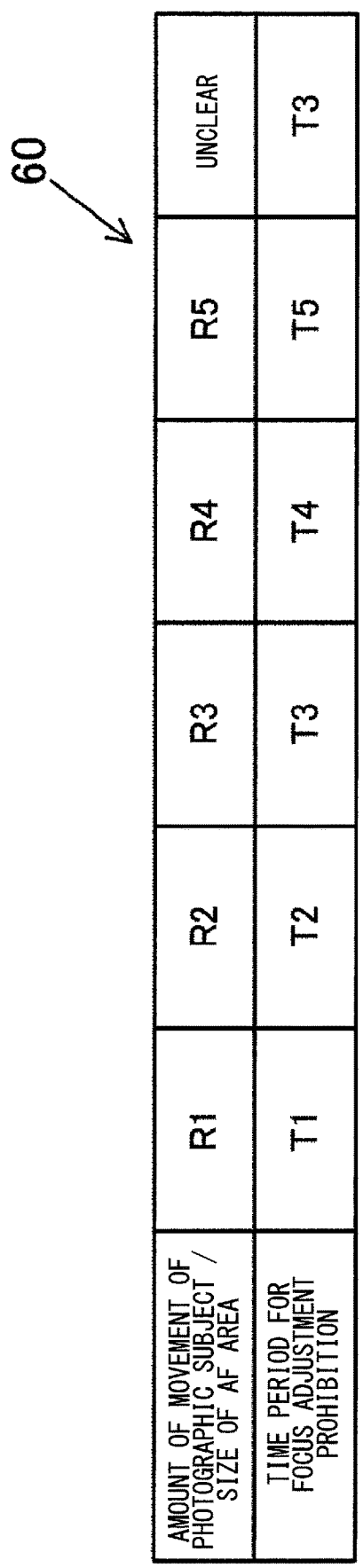
FIG. 6 shows an example of a control table according to the second embodiment.

Accordingly, in the present embodiment, in order to set the predetermined time period for limitation or prohibition of the focus adjustment operation according to the amount of movement of the photographic subject and the size of the focus detection region, the ratio of the amount of movement of the photographic subject to the size of the focus detection region and the predetermined time period for limitation or prohibition of focus adjustment are made to correspond as follows. That is, as shown in FIG. 6, the ratio of the amount of movement of the photographic subject to the size of the focus detection region (i.e. to the size of the AF area) is divided into the five ranges R1, R2, R3, R4, and R5, and predetermined time periods T1, T2, T3, T4, and T5 are set to correspond to each of these ranges R1, R2, R3, R4, and R5 respectively. In detail, the first predetermined time period T1 is set for the range R1 (=1/10 or less), and the second predetermined time period T2 which is longer than the first predetermined time period T1 is set for the range R2 (=1/10 or greater and less than 1/3). In a similar manner, the third predetermined time period T3 which is longer than the second predetermined time period T2 is set for the range R3 (=1/3 or greater and less than 1), the fourth predetermined time period T4 which is longer than the third predetermined time period T3 is set for the range R4 (=1 or greater and less than 2), and the fifth predetermined time period T5 which is longer than the fourth predetermined time period T4 is set for the range R5 (=2 or greater). Moreover, if the ratio of the amount of movement of the photographic subject to the size of the focus detection region is not clear for some reason, for example if the motion vector information acquisition unit 47 has not been able to acquire the amount of movement of the photographic subject, then the predetermined time period T3 for the standard range R3 is set.

It should be understood that the relationship between the ranges R1, R2, R3, R4, and R5 and the predetermined time periods T1, T2, T3, T4, and T5 shown in FIG. 6 is stored in a control table 60 in the memory of the body control unit 21. According to the region information specifying the size of the focus detection region that has been acquired by the region information acquisition unit 46 and the information specifying the amount of movement of the photographic subject that has been acquired by the motion vector information acquisition unit 47, the focus adjustment control unit 45 selects the corresponding predetermined time period from the control table 60, in other words sets that corresponding predetermined time period. If for example the ratio of the amount of movement of the photographic subject to the size of the focus detection region is within the range R1, then, when the amount of change of the defocusing amount exceeds the predetermined threshold value, the focus adjustment control unit 45 executes the AF lock on function and limits or prohibits the focus adjustment operation for the first predetermined time period T1. In a similar manner, if the ratio of the amount of movement of the photographic subject to the size of the focus detection region is within the range R2, R3, R4, or R5, then, when the amount of change of the defocusing amount exceeds greater than the predetermined threshold value, the focus adjustment control unit 45 limits or prohibits the focus adjustment operation by executing the AF lock on function for the second, third, fourth, or fifth predetermined time period T2, T3, T4, or T5 respectively.

Figure 7:
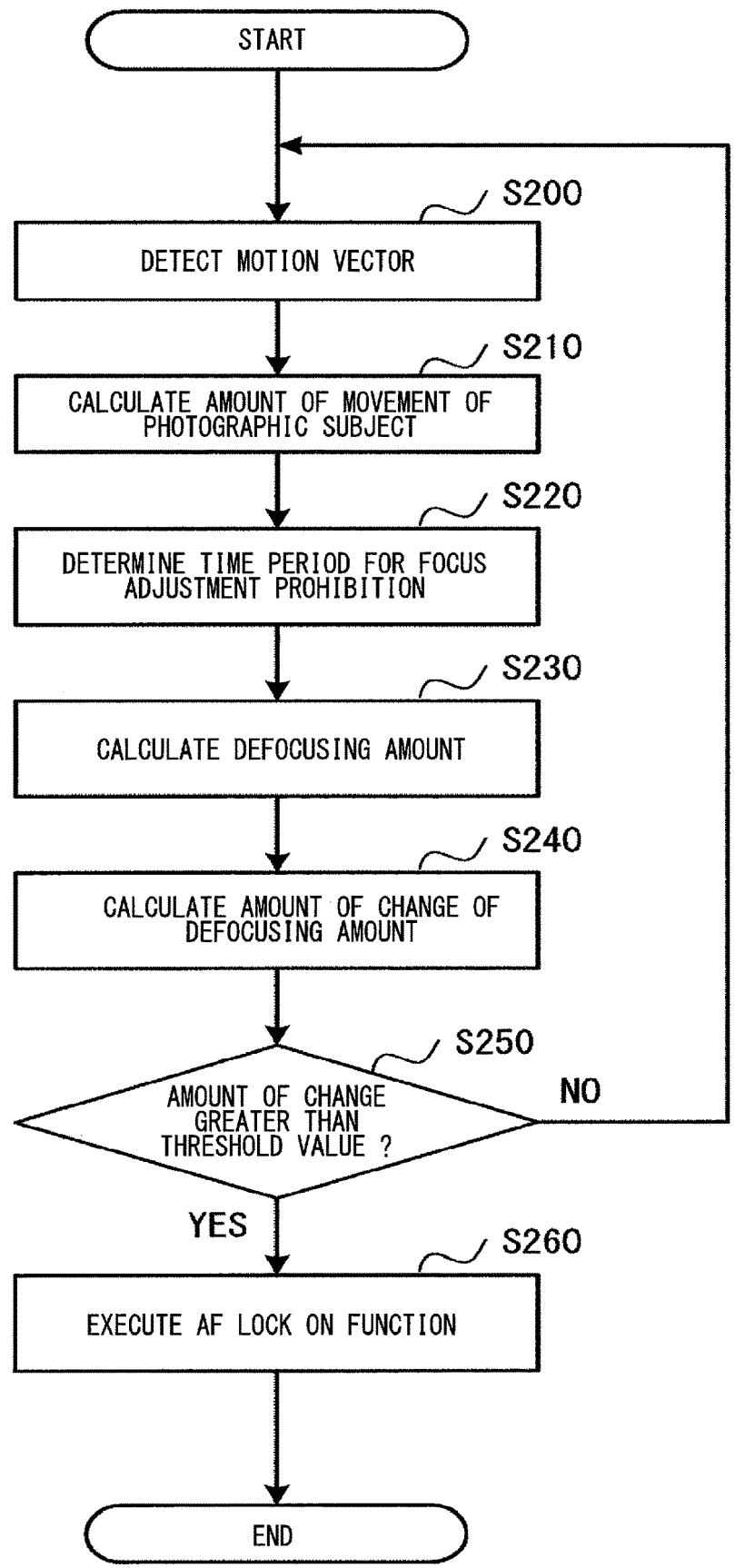
FIG. 7 is a flow chart showing an example of the operation of the image capture device according to the second embodiment.

FIG. 7 is a flow chart showing an example of the operation of this image capture device according to the second embodiment. The processing shown in FIG. 7 is, for example, executed repeatedly while photography is being performed.

In step S200, the body control unit 21 detects the motion vector of the photographic subject by employing image data corresponding to a plurality of frames outputted from the imaging element 22. And then in step S210 the body control unit 21 calculates the amount of movement of the photographic subject on the basis of the motion vector of the photographic subject, and acquires information specifying this amount of movement of the photographic subject as related information. Then in step S220, on the basis of the amount of movement of the photographic subject, the size of the focus detection region acquired by the region information acquisition unit 46, and the control table 60 shown in FIG. 6, the body control unit 21 sets a predetermined time period for limitation or prohibition of the focus adjustment operation with the AF lock on function. And in step S230 the body control unit 21 performs focus detection calculation by a phase detection method.

In step S240, the body control unit 21 calculates the difference between the defocusing amount that was calculated by the focus detection calculation in the previous cycle and the defocusing amount that has been calculated by the focus detection calculation in the current cycle, in other words calculates the amount of change of the defocusing amount. Then in step S250 the body control unit 21 makes a decision as to whether or not the amount of change of the defocusing amount is greater than the predetermined threshold value. If the amount of change of the defocusing amount is greater than the predetermined threshold value, then the flow of control proceeds to step S260 and the AF lock on function is started, and focus adjustment operation is limited or prohibited for the predetermined time period that was set in step S220.

On the other hand, if in step S250 the amount of change of the defocusing amount is not greater than the predetermined threshold value, then the flow of control returns to step S200. In this manner, in the present embodiment, while photography is being performed, it is possible automatically to change over the predetermined time period for limitation or prohibition of the focus adjustment operation with the AF lock on function, according to the amount of movement of the photographic subject and according to the size of the focus detection region.

It should be understood that it would also be acceptable for the predetermined time period over which the focus adjustment operation is limited or prohibited by the AF lock on function to be determined only upon the basis of the amount of movement of the photographic subject. In this case, for example, the predetermined time period during which focus adjustment is limited or prohibited may be made to be longer with increase in the amount of movement of the photographic subject, since it is considered that, the greater the amount of movement of the photographic subject is, the longer the time period during which the photographic subject stays outside the focus detection region may become. By limiting or prohibiting focus adjustment for a predetermined time period that is determined in consideration of the amount of movement of the photographic subject, it becomes possible to recapture the photographic subject within the focus detection region and thus to keep the focus continuously adjusted upon the photographic subject, even if the photographic subject temporarily moves out from the focus detection region.

Furthermore, it would also be acceptable for the predetermined time period over which the focus adjustment operation is limited or prohibited by the AF lock on function to be determined only on the basis of the size of the photographic subject detection region. In this case, for example, the predetermined time period during which focus adjustment is limited or prohibited may be made to be longer with decrease in the size of the focus detection region, since it is considered that, the smaller the size of the focus detection region is, the longer the time period over which the photographic subject stays outside the focus detection region may become. By limiting or prohibiting focus adjustment for a predetermined time period that is determined in consideration of the size of the focus detection area, it becomes possible to keep tracking the photographic subject continuously.

According to the second embodiment as described above, the following advantageous operational effects are obtained.

(1) The camera body 2 comprises the focus detection unit 41 that repeatedly detects the focus adjustment state of the optical system 31, the focus adjustment unit 42 that performs focus adjustment of the optical system 31 on the basis of the result of detection by the focus detection unit 41, the motion vector information acquisition unit 47 that acquires the related information related to the motion vector of the main photographic subject, and the control unit (i.e. the focus adjustment control unit 45) that limits or prohibits focus adjustment by the focus adjustment unit 42 for the predetermined time period if the amount of change of the result of detection by the focus detection unit 41 exceeds the threshold value. The length of the predetermined time period is determined on the basis of the related information acquired by the motion vector information acquisition unit 47. In the present embodiment, the time period for limiting or prohibiting focus adjustment by the AF lock on function is determined on the basis of the motion vector of the photographic subject. Due to this, even if the movement of the photographic subject changes, it is possible to adjust the setting of the AF lock on function so as to be appropriate for the photographic subject. Accordingly it is possible to prevent the setting of the AF lock on function, which was appropriate at the start of photography, from becoming inappropriate while photography is being performed. As a result, it becomes possible to keep tracking the photographic subject in a continuous manner.

(2) The focus adjustment control unit 45 makes the predetermined time period longer with increase in the related information. In the present embodiment, the predetermined time period for limitation or prohibition of focus adjustment is made to be longer, the greater is the amount of movement of the photographic subject. In this manner, it is possible to perform photography while adjusting the setting for the AF lock on function to be appropriate for the subject that is to be photographed, even if the movement of the photographic subject changes.

(3) The camera body 2 comprises the focus detection unit 41 that repeatedly detects the focus adjustment state of the optical system 31, the focus adjustment unit 42 that performs focus adjustment of the optical system 31 on the basis of the result of detection by the focus detection unit 41, the region information acquisition unit 46 that acquires region information related to the size of the focus detection region, and the control unit (i.e. the focus adjustment control unit 45) that limits or prohibits focus adjustment by the focus adjustment unit 42 for the predetermined time period, if the amount of change of the result of detection by the focus detection unit 41 exceeds the threshold value. The length of the predetermined time period is determined on the basis of the region information acquired by the region information acquisition unit 46. In the present embodiment, the time period for limitation or prohibition of focus adjustment by the AF lock on function is determined on the basis of the size of the focus detection region. Due to this, it is possible to adjust the setting of the AF lock on function to be appropriate for the size of the focus detection region. As a result, it becomes possible to keep tracking the photographic subject in a continuous manner.

(4) The camera body 2 further comprises the focus detection region setting unit 48 that is capable of setting, as the focus detection region, either the first focus detection region or the second focus detection region that is larger than the first focus detection region. And the focus adjustment control unit 45 makes the predetermined time period to be longer when the first focus detection region has been set by the focus detection region setting unit 48, than when the second focus detection region has been set. In this manner, it is possible to adjust the setting for the AF lock on function to be appropriate for the size of the focus detection region, so that it becomes possible to keep tracking the photographic subject in a continuous manner.

(5) In a case such as photography of a soccer game or the like in which the movement of the photographic subject is irregular or unpredictable and the movement of the photographic subject may suddenly become abrupt or frozen, if the predetermined time period for limitation or prohibition of focus adjustment by the AF lock on function is a fixed time period, then in some cases focus adjustment operation may undesirably be performed upon a subject other than the subject that is to be photographed. However, in the present embodiment, the predetermined time period for limitation or prohibition of focus adjustment is changed over according to the motion vector of the photographic subject and/or the size of the focus detection region. Due to this, it is possible to prevent the setting for the AF lock on function from becoming an inappropriate setting while photography is being performed, so that it becomes possible to keep the focus upon the photographic subject in a continuous manner.

Modifications as described below are also included within the scope of the present invention, and moreover it would also be possible to combine one or a plurality of the following variant embodiments with one of the embodiments described above.

Variation 1

In the first embodiment described above, an example was explained in which, as related information related to the magnification ratio of the main photographic subject, information specifying the photographic subject magnification ratio (i.e. the reproduction ratio) was acquired, and the threshold value for the AF lock on function was set according to the magnitude of the photographic subject magnification ratio. However, as the related information related to the magnification ratio of the main photographic subject, it would also be acceptable to acquire information specifying the ratio of the size of the main photographic subject image to the size of the captured image, and to set the threshold value for the AF lock on function according to this ratio of the size of the main photographic subject image to the size of the captured image. In this case, for example, the threshold value for the AF lock on function should be made to be larger, the larger is the ratio of the size of the main photographic subject image to the size of the captured image.

Variation 2

It would also be acceptable for the motion vector information acquisition unit 47 to calculate the speed of movement of the photographic subject on the basis of its motion vector, and to acquire information specifying the speed of movement of the photographic subject as the related information. Even if the size of the focus detection region is the same, if the speed of movement of the photographic subject is high, then it is considered that the time period over which the photographic subject undesirably says out of the focus detection region may become long; while, if the speed of movement of the photographic subject is low, then the time period over which the photographic subject undesirably stays out of the focus detection region may become short. Due to this, it is arranged for the focus adjustment control unit 45 to make the predetermined time period for limitation or prohibition of focus adjustment longer, the greater is the speed of movement of the photographic subject. By changing the predetermined time period for limitation or prohibition of focus adjustment according to the speed of movement of the photographic subject in this manner, it becomes possible to keep tracking the photographic subject in a continuous manner. Furthermore, in this case, it would also be acceptable to establish a correspondence between the ratio of the speed of movement of the photographic subject to the size of the focus detection region and the predetermined time period for limitation or prohibition of focus adjustment so as to set the predetermined time period for limitation or prohibition of focus adjustment operation according to the size of the focus detection region and the speed of movement of the photographic subject.

Variation 3

While, in the embodiments and variations described above, the present invention has been explained in terms of examples of application to a digital camera which serves as an image capture device, it would also be possible for the present invention to be applied to a device of some other type, for example to a smart phone, a tablet, a personal computer, a camera internal to a PC, an in-vehicle camera, or the like.

While various embodiments and variations have been explained as described above, the present invention is not to be considered as being limited by the details thereof. Other aspects that are considered to come within the range of the technical concept of the present invention are also included within the scope of the present invention.

The present invention also includes camera bodies of the following types.

(1) A camera body comprising: a focus detection unit that, on the basis of a signal outputted by capturing light incident via an optical system, performs focus detection for the optical system; a focus adjustment unit that performs focus adjustment of the optical system on the basis of the result of detection by the focus detection unit; an acquisition unit that acquires information related to the magnification ratio of a photographic subject; and a control unit that limits the focus adjustment by the focus adjustment unit, on the basis of the result of detection by the focus detection unit and the information acquired by the acquisition unit.

(2) The camera body as in (1), wherein the control unit limits the focus adjustment by the focus adjustment unit when the amount of change of the result of detection by the focus detection unit is greater than a threshold value that is based upon the information acquired by the acquisition unit.

(3) The camera body as in (2), wherein the control unit increases the threshold value with increase in the magnification ratio of the photographic subject.

(4) The camera body as in (2) or (3), wherein the control unit determines the threshold value on the basis of the result of detection by the focus detection unit and the information acquired by the acquisition unit.

(5) The camera body as in any one of (2) through (4), wherein: the focus detection unit detects the amount of deviation between the in-focus position of the optical system and the imaging surface of the image capturing unit on the basis of the signal described above; the acquisition unit acquires the magnification ratio of the optical system, or the reproduction ratio, or the size of the photographic subject; and the control unit limits the focus adjustment with the focus adjustment unit on the basis of the amount of deviation and the magnification ratio of the optical system, or the reproduction ratio, or the size of the photographic subject.

(6) The camera body as in (5), wherein the control unit limits the focus adjustment by the focus adjustment unit when the amount of change of the amount of deviation is greater than a threshold value based upon the magnification ratio of the optical system, or the reproduction ratio, or the size of the photographic subject.

(7) The camera body as in (5) or (6), wherein the control unit determines the threshold value described above on the basis of the amount of deviation, and the magnification ratio of the optical system or the reproduction ratio or the size of the photographic subject.

(8) The camera body as in any one of (5) through (7), comprising an image capturing unit that captures light incident via an optical system and outputs image data and a face detection unit that detects a face from an image generated from image data outputted by the image capturing unit, and wherein the reproduction ratio or the size of the photographic subject is the reproduction ratio or the size of the face detected by the face detection unit.

(9) A camera body, comprising: a focus detection unit that, on the basis of a signal outputted by capturing light incident via an optical system, performs focus detection for the optical system; a focus adjustment unit that performs focus adjustment of the optical system on the basis of the result of detection by the focus detection unit; an acquisition unit that acquires information related to the motion vector of a photographic subject; and a control unit that, for a predetermined time period, limits the focus adjustment by the focus adjustment unit, on the basis of the result of detection by the focus detection unit and the information acquired by the acquisition unit.

(10) The camera body as in (9), wherein, when the amount of change of the result of detection by the focus detection unit is greater than a threshold value, the control unit described above limits the focus adjustment by the focus adjustment unit for a predetermined time period based on the information acquired by the acquisition unit.

(11) The camera body as in (9) or (10), wherein the control unit makes the predetermined time period to be longer as the motion vector is greater.

(12) The camera body as in any one of (9) through (11), wherein: the focus detection unit detects the amount of deviation between the in-focus position of the optical system and the imaging surface of the image capturing unit on the basis of the signal described above; the acquisition unit acquires a motion vector quantity of the photographic subject; and the control unit limits the focus adjustment by the focus adjustment unit on the basis of the amount of deviation and the motion vector quantity.

(13) A camera body, comprising: a focus detection unit that, on the basis of a signal outputted by capturing light incident via an optical system, performs focus detection for the optical system in a focus detection region; a focus adjustment unit that performs focus adjustment of the optical system on the basis of the result of detection by the focus detection unit; an acquisition unit that acquires information related to the size of the focus detection region; and a control unit that, for a predetermined time period, limits the focus adjustment by the focus adjustment unit, on the basis of the result of detection by the focus detection unit and the information acquired by the acquisition unit.

(14) The camera body as in (13), wherein, when the amount of change of the result of detection by the focus detection unit is greater than a threshold value, the control unit limits the focus adjustment by the focus adjustment unit for a predetermined time period based on the information acquired by the acquisition unit.

(15) The camera body as in (13) or (14), comprising a focus detection region setting unit that is capable of setting, as the focus detection region, either a first focus detection region or a second focus detection region that is larger than the first focus detection region; and wherein the control unit sets the predetermined time period to be longer when the first focus detection region is set by the focus detection region setting unit, than when the second focus detection region is set.

(16) The camera body as in any one of (13) through (15), wherein the length of the predetermined time period described above is determined on the basis of the amount of movement of the photographic subject or the speed of movement of the photographic subject, and the size of the focus detection region.

(17) The camera body as in any one of (13) through (16), wherein: the focus detection unit detects the amount of deviation between the in-focus position of the optical system and the imaging surface of the image capturing unit on the basis of the signal described above; the acquisition unit acquires the magnification ratio of the optical system, or the reproduction ratio, or the size of the photographic subject; and the control unit limits the focus adjustment by the focus adjustment unit, when the amount of change of the amount of deviation is greater than a threshold value that is based upon the motion vector quantity of the photographic subject.

The content of the disclosure of the following application, upon which priority is claimed, is hereby incorporated herein by reference:

Japanese Patent Application No. 2016-130687 (filed on 30 Jun. 2016).

REFERENCE SIGNS LIST

2: camera body
3: interchangeable lens
21: body control unit
22: imaging element
31: image forming optical system
41: focus detection unit
42: focus adjustment unit
43: photographic subject detection unit
44: magnification information acquisition unit
45: focus adjustment control unit
46: region information acquisition unit
47: motion vector information acquisition unit
48: focus detection region setting unit

The invention claimed is:
1. A camera, comprising:
an image capturing unit that outputs a signal by capturing a subject image via an optical system having a focus adjustment optical system;
a detection unit that detects an in-focus position at which the subject image is in focus on the image capturing unit by the optical system based on the signal outputted from the image capturing unit;
a control unit that controls shifting of the focus adjustment optical system so as to focus upon a specified subject based on the in-focus position detected by the detection unit; and an acquisition unit that acquires at least one of information related to the specified subject and information related to the optical system;

wherein the control unit limits the shifting of the focus adjustment optical system for a time period that is set based on the information acquired by the acquisition unit.

2. The camera according to claim 1, wherein:

the detection unit detects an amount of deviation between the in-focus position and the image capturing unit; and the control unit limits the shifting of the focus adjustment optical system based on the amount of deviation and a threshold value that is set based on the information.

3. The camera according to claim 2, wherein:

the control unit limits the shifting of the focus adjustment optical system if the amount of deviation is equal to or greater than the threshold value, and allows a focus adjustment to shift if the amount of deviation is smaller than threshold value.

4. The camera according to claim 2, wherein:

the information related to the specified subject is information related to a distance to the specified subject, a focus distance, a size of the specified subject, and a size of an image of the specified subject upon an imaging surface of the image capturing unit; and the information related to the optical system is information related to a focal length, an angle of view, and a reproduction ratio.

5. The camera according to claim 4, wherein the threshold value is greater, as the distance to the specified subject is shorter, or as the focus distance to the specified subject is shorter, or as the size of the specified subject is greater, or as a magnification ratio of the optical system is greater, or as the optical system is set more towards a telephoto side, or as the reproduction ratio is greater, or as the angle of view is narrower.

6. The camera according to claim 1, wherein:

the detection unit detects an amount of deviation between the in-focus position and the image capturing unit; and the control unit compares the amount of deviation and a threshold value that is set based on the information, and determines whether or not to limit the shifting of the focus adjustment optical system.

7. The camera according to claim 1, wherein:

the information related to the specified subject is information related to at least one of a motion vector of the specified subject and speed of the specified subject.

8. The camera according to claim 7, wherein the control unit limits the shifting of the focus adjustment optical system such that the time period becomes longer as the motion vector of the specified subject is greater, or as the speed of the specified subject is greater.

9. The camera according to claim 1, wherein:

the information related to the specified subject is information of a size of a region that is employed for detecting the in-focus position of the specified subject.

10. The camera according to claim 9, wherein:

the control unit limits the shifting of the focus adjustment optical system for such that the time period becomes longer as the size of the region is greater.

11. The camera according to claim 1, wherein:

the control unit controls a position of the focus adjustment optical system so as to focus continuously on the specified subject.

* * * * *